June 7, 1955

A. G. EMSLIE 2,710,398

MOVING TARGET INDICATING RADAR SYSTEM

Filed March 29, 1946

INVENTOR
ALFRED G. EMSLIE
BY

*William D. Hall.*

ATTORNEY

INVENTOR
ALFRED G. EMSLIE
BY
William D. Hall.
ATTORNEY

United States Patent Office 2,710,398
Patented June 7, 1955

2,710,398

MOVING TARGET INDICATING RADAR SYSTEM

Alfred G. Emslie, Boston, Mass., assignor, by mesne assignments, to the United States of America as represented by the Secretary of War Application March 29, 1946, Serial No. 657,935

7 Claims. (Cl. 343—7.7)

This invention relates to radar or radio object locating systems and more particularly to such systems which are adapted to provide an indication of objects which are moving relative to the radar system.

In the copending application of Robert H. Dicke, entitled "Communication System," Serial No. 590,052, filed April 24, 1945, which issued December 26, 1950, as Patent No. 2,535,274, a radio object locating system is described which will provide an indication of targets or other objects which are moving relative to the system. The term "target" as used hereinafter will be taken to, include all reflecting objects. In the system described in the above cited application moving target indication is accomplished by utilizing in the system a coherent reference oscillation which is fixed in phase relationship to the transmitted signal from the radar system. This coherent reference signal is combined in an algebraic manner with the echo signals returned by objects surrounding the system. Stationary targets will produce, upon combination with the reference signal, constant amplitude signals. Moving targets will produce, upon combination with the reference signal, variable amplitude signals. The signals which vary in amplitude are separated from the signals which do not vary in amplitude, and these first-mentioned signals are utilized to produce the desired moving target indication.

In a moving target indication radar system located on a carrier such as an aircraft, it will be obvious that the earth, as well as targets which are stationary relative to the earth, will appear on the indicator of the radar system as moving targets. In many instances it is desirable to be able to eliminate these signals. In certain other instances it may be desired to cancel the indications from targets which have some other predetermined velocity relative to the radar system.

It is an object of the present invention, therefore, to provide a method for the cancellation of signals in a moving target indication radar system which are returned from targets having a predetermined velocity relative to the radar system.

It is another object of the present invention to provide apparatus wherein the cancellation of signals in a moving target indication radar system which are returned from targets having a predetermined velocity relative to the radar system is accomplished.

It is a further object of the present invention to provide apparatus for cancelling signals in a moving target indication radar system which are returned from targets having no motion relative to the earth.

For a better understanding of the invention together with other and further objects thereof, reference is had to the following description which is to be read in connection with the accompanying drawings in which.

Figure 1:
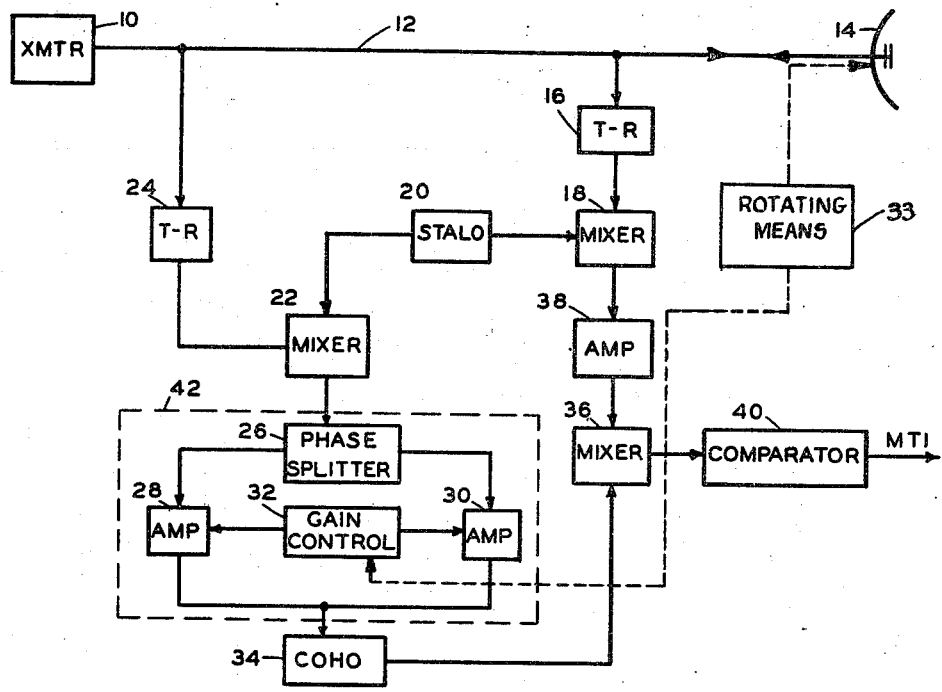
Fig. 1 is a block diagram of a radar or radio object locating system which illustrates the present invention.

Referring now to the drawings, and more particularly to Fig. 1 thereof, there is shown a moving target indication radar system comprising a transmitter 10 connected by a suitable transmission line 12 to an antenna 14. Antenna 14 may be rotated by rotating means 33. Connection is made from the transmission line 12 through a transmit-receiver (T-R) device 16 to a mixer 18. The transmitter 10 is adapted to transmit short duration, high peak power, carrier frequency exploratory pulses via the antenna 14, which is highly directional. The T-R device 16 is essentially an amplitude discriminator which prevents transmitted signals from reaching the mixer 18 in damaging magnitude. The mixer 18 may be any non-linear mixing device. A stable local oscillator, hereinafter called stalo, 20 is electrically connected to the mixer 18 and to a second mixer 22 which is similar to the mixer 18. A second T-R device 24, similar to T-R device 16, is connected from the transmission line 12 to the mixer 22. The ouput of the mixer 22 is connected to a phase splitter 26 which provides two signals 90° out-of-phase which are respectively applied to amplifiers 28 and 30. A gain control 32 is connected to the amplifiers 28 and 30. It will be later shown that the connection between the gain control 32 and the amplifiers 28 and 30 may be either electrical or mechanical in nature. If the antenna is rotated, gain control 32 is connected to rotating means 33 so that the gain of amplifiers 28 and 32 becomes a function of the pointing of antenna 14. The outputs of the amplifiers 28 and 30 are combined and applied to a coherent reference oscillator 34 hereinafter termed coho. The output of the coho 34 is connected to a mixer 36 to which there is also applied to signal from the mixer 18 which has been amplified by an amplifier 38. The output of the mixer 36 is applied to a comparator circuit 40 which provides an output labeled MTI for moving target indication. The comparator circuit 40 may be any device capable of differentiating between signals which vary in amplitude and signals which do not vary in amplitude by providing an output signal in response only to varying signals, and one example of such a circuit is shown in my Patent No. 2,512,144.

In operation exploratory pulses from the transmitter 10 are radiated by the antenna 14. A portion of the signal from the transmitter 10 passes through the T-R device 24 to the mixer 22 wherein it is combined with a signal from the stalo 20. When it is desired to provide cancellation of signals returned by objects having a predetermined velocity relative to the radar system, the phase of the coho reference signal, which is controlled by the output of the mixer 22, must be continuously and linearly varied as a function of time. It can be shown that the angle α by which the coherent signal must be shifted from the time of occurrence of one signal from a specified target to the next occurring signal from the same target is given by the equation $$\alpha = \frac{2V_r}{\lambda f} \quad (1)$$

in which $V_r$ is the relative velocity of the radar system and the signal returning target, $f$ is the repetition frequency of transmission from the transmitter of the radar system, and $\lambda$ is the wavelength of the coherent reference signal. In the present invention cancellation of the indication from targets having any specific velocity relative to the radar system is accomplished by altering the phase of the coho reference signal at the time of transmission of each signal from the transmitter 10. This shift in phase is accomplished by that portion of the system of Fig. 1 enclosed by the dashed block 42 and in the following manner.

The locking pulse output signal of the mixer 22 is applied to the phase splitter 26 which divides this output signal into two components which differ in phase by 90°. The two resulting signals are applied to the two amplifiers 28 and 30. The amplifiers 28 and 30 are of a type the gain of which may be varied a given amount above and given amount below a given quiescent value. The respective gains of the amplifiers 28 and 30 are varied in sinusoidal and cosinusoidal manners by the gain control 32 at a frequency which may be determined from Equation 1. Since $\alpha$ is the phase change of the coho reference signal per pulse repetition period, the phase change per second is equal to $f\alpha$. The frequency at which the gains of amplifiers 28 and 30 are varied is then equal to $$\frac{f\alpha}{2\pi}$$

The outputs of the amplifiers 28 and 30 are algebraically combined and utilized to control the phase of oscillation of the coho 34. Because of the fixed 90° relationship between the output signal from amplifiers 28 and 30 and the trigonometric relationship between their amplitudes, the phase of the signal resulting from their combination will vary linearly with time. The phase of the reference signal from the coho 34 may be controlled in any of several ways, examples of which are given in the copending application of Robert A. McConnell, entitled "Electrical Circuit," Serial No. 623,393, filed October 19, 1945, which was abandoned September 2, 1952.

The coho signal is applied to the mixer 36 wherein it is combined with signals corresponding to signals returned from reflecting targets. The returned signals are mixed in mixer 18 with signals from the stalo 20 and the resulting signal amplified by amplifier 38 prior to their application to the mixer 36. The output of the mixer 36 will be a series of voltage pulses which, for any specific target, will vary in amplitude or be of constant amplitude depending upon whether or not the relative velocity of the radar system and the target is equal to the cancellation velocity, $V_r$, of Equation 1. The comparator 40 selects those signals which vary in amplitude and use is made of them to provide moving target indication on a suitable indicator (not shown) such as a cathode ray tube.

Figure 2:
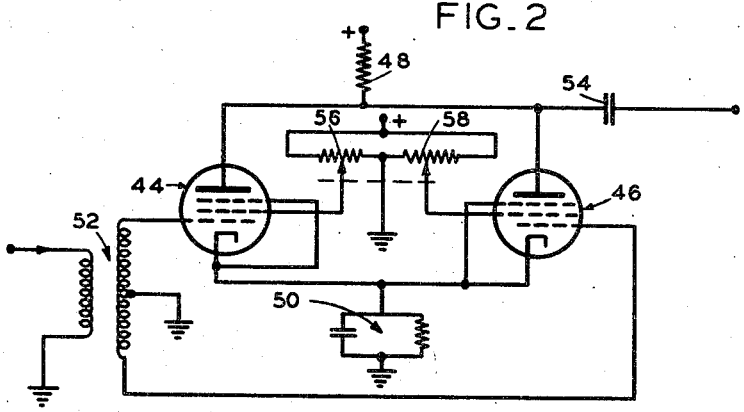
Figs. 2 and 3 are schematic diagrams which illustrate two means of accomplishing certain results in the present invention, and, Fig. 4 illustrates in block diagram form another portion of the present invention.
Figure 3:
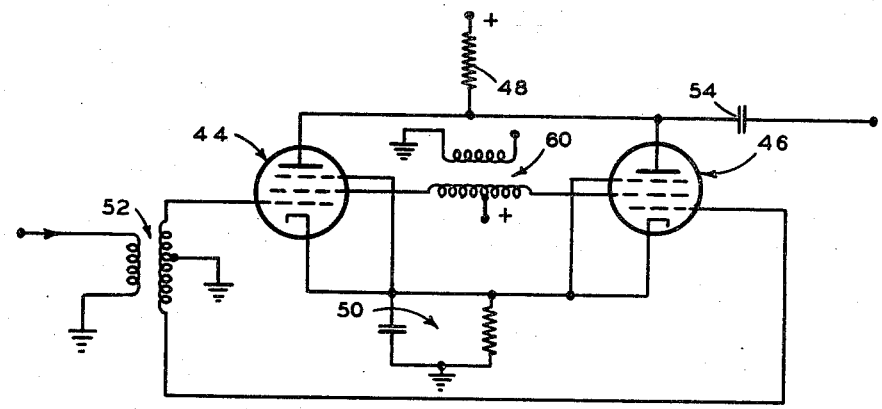

Reference is now had to Figs. 2 and 3 which show two amplifiers which may be used as either amplifier 28 or 30 of Fig. 1 and which provide a gain which may be varied from a maximum in the positive direction to a maximum in the negative direction, that is, the gain can be varied to produce an output signal varying from zero to a maximum either in the same phase or opposite phase to the input signal. The amplifiers of Figs. 2 and 3 differ in that the gain of the amplifier Fig. 2 is controlled by mechanical means whereas the gain of the amplifier on Fig. 3 may be controlled by electrical means. The amplifiers of Figs. 2 and 3 comprise two electron tubes 44 and 46 which have a common plate load resistor 48 and a common cathode biasing network 50. The input signal to the tubes 44 and 46 is applied to the control grids thereof in a push-pull manner by means of a suitable transformer 52. The output from the amplifiers of Figs. 2 and 3 is taken from the anodes of the tubes 44 and 46 through a capacitor 54.

In Fig. 2 the screen grids of tubes 44 and 46 are connected respectively to potentiometers 56 and 58, one terminal of each potentiometer being connected to ground and the remaining terminal of each potentiometer being connected to a suitable source positive potential. The contact arms of the potentiometers 56 and 58, which are connected to the screen grids of the two tubes, are mechanically connected together in such a manner that when the potential on the screen grid on one tube is increased the potential of the screen grid on the remaining tube will decrease.

In Fig. 3 the screen grids of the tubes 44 and 46 are connected to the secondary winding of the transformer 60, a center tap of which is connected to a suitable source of positive potential. The primary winding of the transformer 60 is connected to a suitable source (not shown) which provides a voltage for varying the gain of the amplifier in the desired manner.

With a signal of a given amplitude and phase applied to the transformer 52, the amplitude and phase of the output signal at the capacitor 54 will depend upon the total gain of the amplifier. When the potentiometers 56 and 58 are so adjusted that the potential applied to the screen grid of the tube 44 is a maximum and the potential applied to the screen grid of the tube 46 is a minimum, the signal applied to the control grid of the tube 44 will be amplified a maximum amount. At the same time the signal applied to the control grid of the tube 46 will not be amplified at all. The ouput of the amplifier will, therefore, be the signal amplified by the tube 44. When the contact arms of the potentiometers 56 and 58 are at the other extreme, the tube 44 will have zero gain and the tube 46 have a maximum gain. In this latter instance, the output of the amplifier will again be a maximum but of opposite polarity to that of the previous case. At intermediate settings of the potentiometers 56 and 58, the gain of the amplifier will be equal to the algebric sum of the gain of the tubes 44 and 46. The amplifiers 28 and 30 of Fig. 1 may each be of the type shown in Fig. 2 in which instance the gain control 32 of Fig. 1 will, by mechanical means, control the setting of the potentiometers 56 and 58. As has been before stated, it is necessary that the gains of the amplifiers 28 and 30 be varied in sinusoidal and cosinusoidal manners, respectively, thus requiring that the mechanical connections between the gain control 32 and the amplifiers satisfy this condition.

The amplifier of Fig. 3 differs from the amplifier of Fig. 2 only in the manner in which the potentials of the screen grids of the tubes 44 and 46 are varied. It will be seen that the variable components of the potentials applied to the two screen grids are applied in a push-pull manner as is the case in Fig. 2. When the amplifier in Fig. 3 is used as amplifiers 28 and 30 in Fig. 1, the gain control 32 must provide two voltages which bear a 90° phase relationship to each other. One of the two voltages is applied to transformer 60 in each amplifier.

Figure 4:
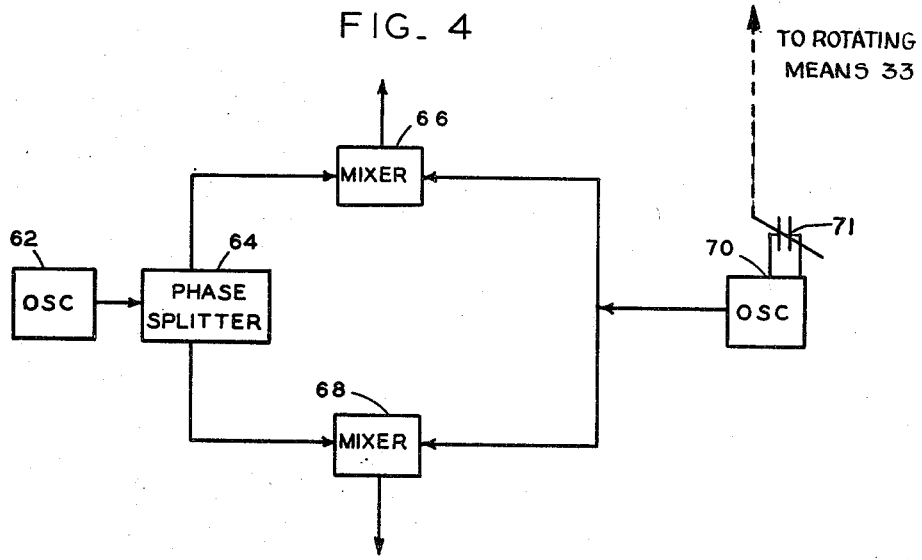

Reference is now had to Fig. 4 which illustrates in block diagram form a circuit which may be used to obtain two signals bearing a 90° phase relationship to each other.

A circuit of the type represented in Fig. 4 will not be necessary if the frequency of the signal applied to the transformer 60 in constant. If, however, the antenna of the moving target indication radar system is rotated by rotating means 33, and if it is desired to provide cancellation of all targets which do not move relative to the earth, it will be necessary to alter the frequency of the signal applied to the transformer 60 in a manner determined by the product of the ground speed multiplied by the cosine of the angle between the pointing of the antenna of the radar system and the ground track of the carrier on which the radar system is located.

In the circuit of Fig. 4 the signal from an oscillator 62, operating at a relatively high fixed frequency, is connected to a phase splitter 64 which divides the signal into two components which bear a 90° phase relationship to each other. The two signals from the phase splitter 64 are respectively applied to two mixers 66 and 68. Also applied to the two mixers 66 and 68 is a second signal from an oscillator 70 which operates at a frequency differing from the frequency of the oscillator 62 by an amount varying as the cosine of the pointing angle of the antenna relative to the ground track or the heading angle of the aircraft and equal to the desired frequency of the signal to be applied to the transformer 60 of Fig. 3.

The frequency of the second signal may be varied in accordance with the cosine of the angle between the pointing of the antenna of the radar system and the ground track of the carrier on which the radar system is located by providing oscillator 70 with variable condenser 71, which is varied by rotating means 33. The difference frequency components resulting from the action of the mixers 66 and 68 are then utilized for application to the amplifiers 28 and 30 of Fig. 1. It can be shown that these signals will bear the proper phase relationship to each other regardless of their frequency.

Although Figs. 2, 3, and 4 illustrate circuits for accomplishing certain desired results in this invention, it will be obvious that other circuits well-known in the art capable of accomplishing the same end results may be used. Therefore, while there has been described what is at present considered to be the preferred embodimnt of the invention, it will be obvious that further changes and modifications may be made without departing from the scope and spirit of the invention herein described.

What is claimed is:

1. A moving target indication radar system providing elimination of indications from targets having a predetermined velocity relative to said system comprising a directive antenna, a pulse transmitter connected to said antenna for generating exploratory pulses of electromagnetic energy, first and second mixers connected to said transmitter and said antenna respectively, a stable local oscillator connected to said first and second mixers, a phase splitter connected to said first mixer and adapted to provide two signals which bear a 90 degree phase relationship to each other, first and second amplifiers connected to said phase splitter, gain control means to control the gains of said first and second amplifiers respectively in sinusoidal and cosinusoidal manners at a cyclic frequency which is a function of said predetermined relative velocity, a coherent oscillator connected to the outputs of said first and second amplifiers in such a manner that the phase of oscillation thereof is controlled in accordance with the combined outputs of said first and second amplifiers, a third amplifier means connected to said second mixer, a third mixer connected to said coherent oscillator and said third amplifier, and means connected to said third mixer to provide output signals when the amplitude of successive signals from a specified target vary in amplitude, and output signals being indicative of targets having relative velocities other than said predetermined relative velocity.

2. In a moving target indication radar system employing a coherent oscillator for supplying a reference signal, an apparatus for eliminating the indication from targets having a predetermined velocity relative to said moving target indication system including: means providing a control signal locked in phase with the signal transmitted by said radar system, means shifting the phase of said control signal at a rate which is a function of said predetermined relative velocity, and means applying said phase-shifted control signal to said coherent oscillator for locking said reference signal in phase with said phase-shifted control signal.

3. An apparatus in accordance with the apparatus of claim 2 in which the means shifting the phase of said control signal includes means dividing said control signal into two components bearing a 90 degree phase relationship to each other, means separately amplifying said two components, and means combining said amplified components thereby providing a control signal which is shifted in phase from the initial control signal.

4. A moving object indication radar system comprising a coherent reference signal generator, means for transmitting carrier wave pulse signals, and apparatus for eliminating echo pulses from objects having a predetermined velocity relative to said system, said apparatus including means for generating an initial signal locked in phase with the carrier oscillations of the transmitted pulse signals phase splitting means receptive of said initial signal and providing therefrom two component signals bearing a 90 degree phase relationship to each other, first and second signal amplitude altering means connected to said phase splitter means, amplitude control means connected to said first and second signal amplitude altering means to cause said first and second signal amplitude altering means to alter the amplitudes of said two component signals respectively in sinusoidal and cosinusoidal manners at a frequency which is a function of said predetermined velocity, means for combining the outputs of said first and second signal amplitude altering means in an algebraic manner whereby a control signal is provided which is shifted in phase from said initial signal by equal amounts in equal time intervals, and means for causing said coherent reference signal generator to be locked in phase with said control signal.

5. A moving-object radio location system for eliminating echo pulses from moving objects having a predetermined velocity relative to said system, including means for transmitting short duration carrier frequency exploratory pulses of radiant energy, means for reducing the carrier frequency of each exploratory pulse to obtain a locking pulse, means for varying the phase of the carrier oscillations of said locking pulse relative to the carrier of said exploratory pulse at a rate equal to the rate of change of the phase of the echo pulses reflected by objects having said predetermined relative velocity, a continuous wave reference oscillator, means for applying said locking pulse to said oscillator to synchronize said oscillator with the carrier oscillations of said locking pulse, means for receiving echo pulses, means for reducing the carrier frequency of said echo pulses to a frequency substantially the same as the frequency of said reference oscillator, means for combining the output of said reference oscillator and said reduced carrier frequency echo pulses, and means connected to said last-named means for selecting only pulses of varying amplitude.

6. A moving radio object-location system for eliminating echo pulses from objects having a predetermined velocity relative to said system, comprising means for transmitting short duration carrier frequency exploratory pulses of radiant energy including a rotatable directional antenna, means for reducing the carrier frequency of each exploratory pulse to obtain a locking pulse, means for varying the phase of the carrier oscillations of said locking pulse relative to the carrier of said exploratory pulse in synchronism with the rotation of said antenna and at a rate equal to the rate of change of the phase of the echo pulses reflected by objects having said predetermined relative velocity, a reference oscillator, means for applying said locking pulse to said oscillator to synchronize said oscillator with the carrier oscillations of said exploratory pulse, means for receiving echo pulses, means for reducing the carrier frequency of said echo pulses to a frequency substantially the same as the frequency of said reference oscillator, means for combining the output of said reference oscillator and said reduced carrier frequency echo pulses, and means connected to said last-named means for selecting only pulses of varying amplitude.

7. A moving-object radio location system for eliminating echo pulses from objects having a predetermined velocity relative to said system, including means for transmitting short duration carrier frequency exploratory pulses of radiant energy, means for deriving a carrier wave locking pulse from each exploratory pulse, means for varying the phase of the carrier waves of said locking pulse relative to the carrier of said exploratory pulse at a rate equal to the rate of change of the phase of the echo pulses reflected by objects having said predetermined relative velocity, and means for deriving from said locking pulse reference oscillations in phase synchronism with the carrier waves of said locking pulse, means for receiving echo pulses, and means for combining said reference oscillations and said received echo pulses.

References Cited in the file of this patent

UNITED STATES PATENTS

| 2,341,232 | Norton | Feb. 8, 1944 |
| 2,407,000 | Evans | Sept. 3, 1946 |
| 2,448,016 | Busignies | Aug. 31, 1948 |
| 2,529,823 | Starr | Nov. 14, 1950 |
| 2,531,453 | Marchand | Nov. 28, 1950 |
| 2,548,779 | Emslie | Apr. 10, 1951 |
| 2,678,440 | Watt | May 11, 1954 |